Jan. 22, 1952 G. J. BARRY 2,582,951

RADIO RECEIVER TUNING INDICATOR

Filed April 12, 1947

INVENTOR.
GERALD J. BARRY

BY [signature]

ATTORNEY

Patented Jan. 22, 1952 2,582,951

UNITED STATES PATENT OFFICE 2,582,951

RADIO RECEIVER TUNING INDICATOR

Gerald J. Barry, Fort Wayne, Ind., assignor, by mesne assignments, to Farnsworth Research Corporation, a corporation of Indiana Application April 12, 1947, Serial No. 741,107

6 Claims. (Cl. 116—124.1)

This invention relates to tuning indicators for radio receivers and particularly to a compact illuminated tuning dial.

It is conventional practice to provide a radio receiver with a tuning indicator, the face of which bears a scale indicative of the entire tuning range of the receiver. Certain tuning indicators have tuning indicia in the form of a scale etched on a transparent indicator face which is arranged against a relatively opaque or translucent background which, when illuminated, renders a pleasing effect. The observed effect is enhanced when the transparent indicator face is illuminated by edge lighting whereby the etched tuning scale appears prominent on the indicator face. However, an indicator face, having a tuning scale etched thereon, is relatively costly due to the expense of the etching process.

Tuning indicators are conventionally provided with a movable pointer whereby the tuning adjustment of the receiver may be indicated. The movable pointer for a tuning scale which is arranged against a relatively opaque or translucent background, may comprise an intense beam of light which is projected, from behind, upon the background whereby the light beam penetrates therethrough and indicates to the operator the adjustment of the receiver tuning elements. Conventional mechanisms for providing the light beam pointer and moving it across the rear of the indicating face are relatively bulky and require a substantial amount of receiver space and, therefore, cannot normally be accommodated within the smaller type of receiver.

Accordingly, it is the primary object of this invention to provide an inexpensive tuning indicator having edge illumination.

A further object of the invention is to provide, in an edge lighted tuning indicator, a relatively small and compact luminous pointer mechanism, movably arranged behind the scale face of the indicator and requiring a minimum of receiver space for its movement.

In accordance with this invention there is provided a radio receiver tuning indicator comprising first and second transparent members disposed adjacent to one another. Tuning indicia are provided on the rear face of the first member which is disposed adjacent to front face of the second member and a coating is provided on the rear face of the second member. A source of light may be arranged to project light along the adjacent and adjoining faces of the two members thereby to illuminate the tuning indicia.

For a better understanding of the invention, together with other and further objects thereof, reference is made to the following description, taken in connection with the accompanying drawing, and its scope will be pointed out in the appended claims.

Figure 1:
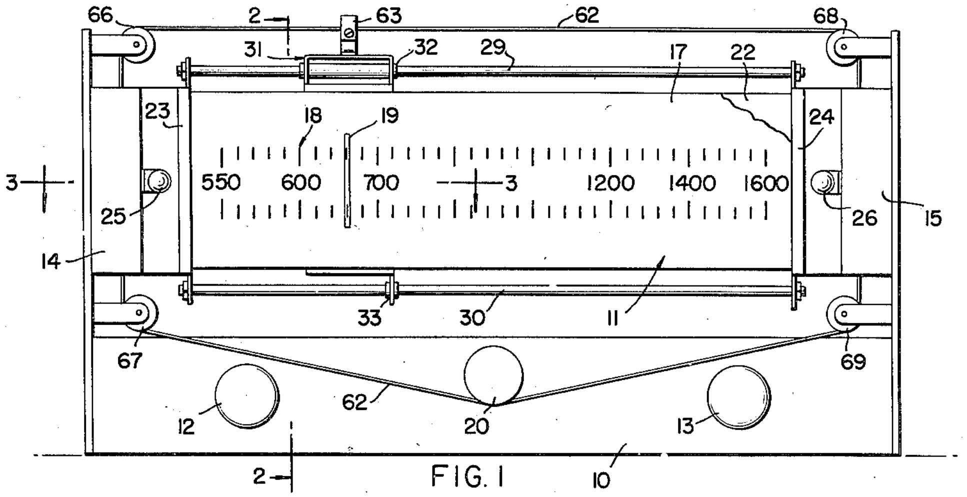
Fig. 1 is a front elevation of a radio receiver chassis including the tuning indicating means and the receiver control means.

Referring now to the drawing and particularly to Fig. 1, there is provided, in accordance with this invention, a radio receiver including a chassis 10 which has a tuning indicator 11 and a pair of control knobs 12 and 13 which may be employed for wave-band switching and volume control purposes, as is conventional. For supporting the tuning indicator 11, there is provided a pair of vertical supporting arms 14 and 15 which are suitably attached to the chassis 10. For indicating the particular tuning adjustment of the receiver the indicator 11 is provided with a tuning scale bearing pane 17 having tuning indicia 18 thereon. A beam of light 19 is projected thereon from the rear, the beam being adapted to move across the scale face 17 in correlated relationship with the adjustment of a tuning control knob 20. Inasmuch as receiver tuning elements are not to be considered a part of the present invention, they are not therefore described or illustrated herein.

The tuning scale pane 17 and a background member 22 are arranged in parallel relation and adjacent to each other and are mounted at each end on the frames 23 and 24. These frames 23 and 24 are affixed to the supporting arms 14 and 15 respectively. Edge lighting means in the form of lamps 25 and 26 are fixed to arms 14 and 15 as shown. It is to be noted, as shown in Fig. 3, that the edge lighting is not applied to the background member 22 but is restricted to the scale pane 17 by the frame member 23 which abuts the edge of the background member 22 thereby to screen it from the light source.

Figures 3, 4, 5:
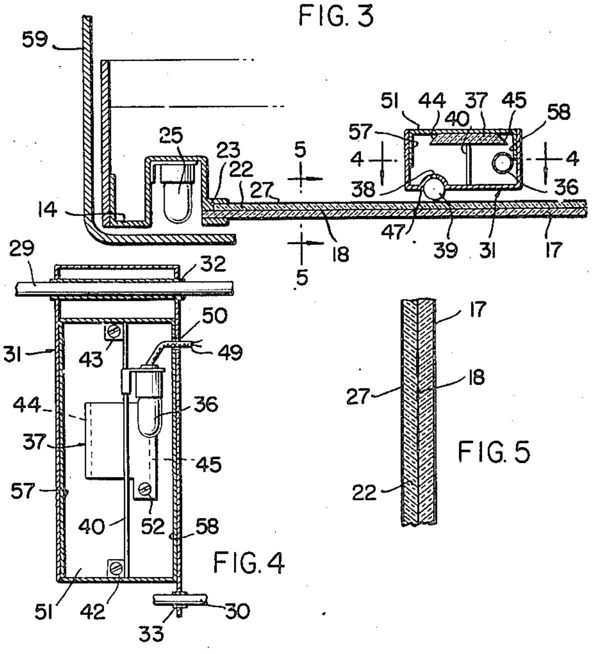
Fig. 3 is a sectional view taken on lines 3—3 of Fig. 1 showing the arrangement of the scale face members, the scale illuminating means, and the luminous pointer apparatus.
Fig. 4 is a sectional view of the luminous pointer apparatus taken on lines 4—4 of Fig. 3.
Fig. 5 is an enlarged sectional view of the tuning scale face members taken on lines 5—5 of Fig. 3.

Referring now to Fig. 5, there is shown an enlarged sectional view of the scale pane 17 and the background member 22. The scale pane 17 is a transparent material such as glass, or a suitable plastic material, and has arranged on the rear surface thereof the indicia 18 which, in one embodiment of the invention, comprises a suitable white paint, or like substance, which is applied by a conventional screening process. The background member 22 may also be of clear glass or plastic material and its front surface is arranged directly against the rear surface of the scale pane 17. Applied to the rear surface of the background member 22 is a suitable translucent coating 27 which preferably is colored and which is almost impervious to the passage of light but which will convey therethrough a portion of an intense beam of light projected thereon.

A pair of rods or tracks 29 and 30 are arranged parallel to the tuning scale pane 17 and along its edges and are supported at each end by the frames 23 and 24. There is provided a carriage 31 slidably mounted on tracks 29 and 30 and having an upper guiding sleeve 32 and a lower guiding sleeve 33. The guiding sleeves are fixed to the carriage 31 and slidably engage the tracks 29 and 30 whereby the carriage may be moved laterally in either direction upon the tracks.

The purpose of the carriage 31 is to support a light source for projecting the light beam 19 upon the rear surface of the background member 22 and reference is now had to Figs. 3 and 4 which are top and front sectional views of the carriage and associated light source. The carriage 31 comprises a compartmented structure which is light shielded and contains therein a light source 36, a light reflecting prism 37, a vertical elongated aperture 38, a cylindrical lens 39 and a light shield 40.

The light source 36 may consist of a conventional dial light bulb, or the like, and is shown in Fig. 4 slidably mounted, for focusing purposes, to the light shield 40. There is also shown connected to the light source 36 a cable 49 which is passed through an aperture 50 in carriage 31 for connection to a power source.

The light shield 40 is fixed as shown in Fig. 4, to the rear wall 51 of the carriage 31 by means of screws 42 and 43 and extends upwardly for the full length of the carriage 31 whereby to bisect the interior and to prevent the direct light rays of the light source 36 from striking the lens 39. The light reflecting prism 37 has two polished reflector surfaces 44 and 45 arranged at an angle of 90 degrees with respect to each other for twice reflecting a light beam generated by the light source 36. The prism 37 is affixed to the rear wall 51 of the carriage 31 by means of screws, such as shown at 52. The interior surfaces of the carriage 31, and the surfaces of the light shield 40 are blackened, whereby undesired light reflections are held to a minimum. The rear surface of the prism 37 and a portion of the front surface of the prism 37 may also be rendered opaque for further restricting undesired light reflections. Understandably, the light reflecting angular surfaces 44 and 45 and a discrete portion of the outer edges of the front surface of the prism will necessarily remain transparent.

Figure 2:
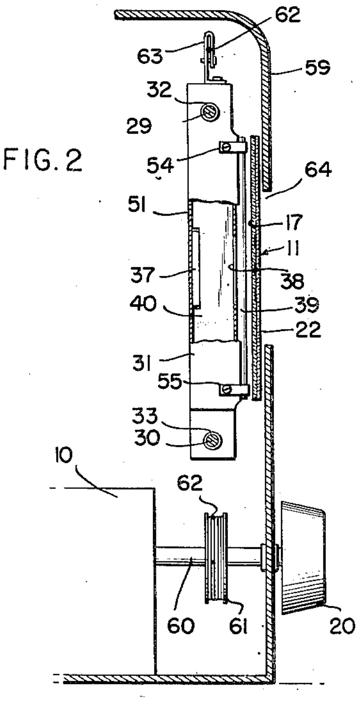
Fig. 2 is an enlarged sectional view of the tuning indicator taken on lines 2—2 of Fig. 1, and having a receiver cabinet added thereto.

Thus, light rays generated by the light source 36 will first strike the reflecting surface 45 which in turn will pass the light to the reflective surface 44. The light beam reflected from the surface 44 may then be projected through the elongated aperture 38 to the cylindrical lens 39. It will be obvious that generally the only light directly impinging upon the lens 39 will be that received from the light source 36 by means of the reflective surfaces 44 and 45 of the prism 37. The lens 39 is arranged upon the front exterior portion of the carriage 31 within a convex indentation 47. As shown in Fig. 2, the lens 39 is mounted by clamps 54 and 55 which are affixed to the side wall of the carriage 31.

The aperture 38 is arranged along the apex of the convex indentation 47 and is in optical alignment with the reflective surface 44 of the prism 37. The light beam emanating from surface 44 is thereby projected through the aperture 38 to the cylindrical lens 39. The lens 39 is arranged immediately adjacent to the coating 27 of the background member 22, and the light beam projected and focused thereon will appear on the front of the tuning scale pane 17 in the form of an elongated luminous line which is employed as a dial pointer. The rear wall 51 of the carriage 31 is arranged with retaining edges 57 and 58 (Fig. 3) which frictionally engage with the side walls so that the rear wall is removable for the purpose of replacing or adjusting the light source 36.

The carriage 31 is moved in such a manner that as the resonant point of the receiver tuning elements is changed, the light beam 19 will indicate this change upon the scale face 17. A receiver cabinet 59 (Fig. 2) has been illustrated which is adapted to contain the chassis 10 and the tuning indicator 11 and is provided with a relatively large aperture 64 to display the scale pane 17 to the operator. The tuning knob 20 is affixed to a tuning shaft 60 (Fig. 2) which is connected to receiver tuning elements, not shown, contained within the chassis. A driving pulley 61 is arranged on the tuning shaft 60 whereby a driving cable 62 may be wound thereon and connected to a driving clamp 63 located atop the carriage 31 for moving the carriage. The cable 62 is arranged in the form of an endless belt (Fig. 1) and consists of a suitable dial cord. For the purpose of guiding the cable between the carriage 31 and the driving pulley 61, there is affixed to the upper and lower extremity of the supporting arm 14 a pair of rollers 66, 67 and there is similarly provided a like pair of rollers 68, 69 on the supporting arm 15. It will be evident that rotation of the tuning knob 20 will cause the shaft 60 and the pulley 61 to rotate and to impart a movement to the cable 62 whereby the carriage 31 is caused to traverse the tracks 29 and 30.

Referring now to the operation of the tuning indicator 11, assume that the receiver is energized, thereby causing energization of the edge lighting lamps 25, 26 and of the light source 36. The energization of the lamps 25 and 26 causes light rays to be projected to the edge of the transparent scale pane 17, which travel throughout the length of the scale pane 17 to strike and illuminate the indicia 18 arranged on its rear surface.

When light source 36 is energized, light rays impinge upon the reflective surface 45 of the prism 37. These rays are conducted by the prism 37 to the opposite reflective surface 44 and are projected through the aperture 38 to the cylindrical lens 39. The translucent coating 27 of the background scale member 22 is generally impervious to light rays, excepting an intense beam of light, such as is projected and focused thereon by the cylindrical lens 39. This light beam appears as a luminous line 19 on the front of the tuning scale pane 17. The actual position of this beam of light 19 with respect to the indicia 18 is correlated with the receiver tuning apparatus and is indicative of the resonance point to which the receiver tuning elements are adjusted. It will be apparent that rotation of the tuning knob 20 will cause the driving cable 62 to move on its associated pulley members and to convey through the cable clamp 63 a like movement to the carriage 31, so that the light beam 19 will similarly move to indicate on the tuning indicia 18 the particular radio frequency to which the receiver tuning elements are adjusted.

It will be evident that the novel tuning indicating mechanism employed in the present invention including a reflecting prism utilized to transfer light rays from their source to the dial face permits the fabrication of a relatively shallow and compact carriage. The compactness thus attained provides for ease of installation of the movable carriage 31 behind a tuning scale and at the same time substantially reduces the depth of the receiver space required for the lateral movement of the carriage. It will be further evident that a considerable saving is effected by applying the indicia 18 to the tuning scale 17 in a relatively inexpensive and simple manner, but the overall effect and the quality of the visual results achieved, equal the results obtained with a tuning scale having thereon the more expensive etched indicia.

Although the embodiment of the invention herein illustrated has a horizontally arranged tuning scale, it is to be understood that this invention has been found adaptable for receiver tuning purposes, where the luminous pointer is arranged to traverse a vertical tuning scale.

It has also been found that the present invention is applicable to radio receivers having a plurality of tuning bands such as short wave or frequency modulation bands in addition to the standard broadcast band. For such receivers, certain modifications of the present invention have been employed whereby the movable carriage is further compartmented and provided with a plurality of light sources to selectively project a separate indicating light beam representative of the selected tuning band. Thus, the selection of a particular wave band provides for the energization of a first light source whereas the selection of a different band will extinguish the first light source and energize a second light source located in another compartment. The light beams are arranged to impinge upon a tuning scale which is indicative of the particular wave band selected.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radio receiver, a tuning indicator comprising a first and a second transparent member arranged adjacent to each other, tuning indicia provided on the face of said first member disposed adjacent to said second member, a substantially translucent coating on the outer face of said second member, a first source of light arranged to project light substantially along the adjacent faces of said members to illuminate said indicia, a carriage, a track disposed substantially parallel to said members for slidably mounting said carriage, means for moving said carriage along said track, a second source of light on said carriage arranged in close proximity to said members, a cylindrical lens mounted on said carriage adjacent to said coating, and means for projecting a beam of light from said second source onto said lens, thereby to provide a narrow luminous pointer.

2. In a radio receiver, a tuning indicator comprising a first and a second transparent member arranged adjacent to each other, tuning indicia provided on the face of said first member disposed adjacent to said second member, a translucent coating on the outer face of said second member, a first source of light arranged to project light substantially along the face of said first member adjacent to said second member to illuminate said indicia, a carriage, a track disposed substantially parallel to said members for slidably mounting said carriage, means for moving said carriage along said track, a second source of light on said carriage arranged in close proximity to said members, an elongated cylindrical lens mounted on said carriage adjacent to said coating, and means for reflecting a beam of light from said second source onto said lens, thereby to provide a narrow elongated luminous pointer.

3. In a radio receiver, a tuning indicator comprising a first and a second transparent plate arranged adjacent to each other, tuning indicia provided on the face of said first plate disposed adjacent to said second plate, a translucent coating on the outer face of said second plate, a first source of light arranged to project light substantially along the face of said first plate adjacent to said second plate to illuminate said indicia, a carriage, a track disposed substantially parallel to said plates for slidably mounting said carriage, means for moving said carriage along said track, a second source of light on said carriage arranged in close proximity to said plates. an elongated cylindrical lens mounted on said carriage adjacent to said coating, and a prism for reflecting a beam of light from said second source onto said lens, thereby to provide a narrow elongated luminous pointer.

4. In a radio receiver, a pointer mechanism for a tuning indicator comprising a carriage, a track for slidably mounting said carriage, means for moving said carriage along said track, said carriage including a substantially light tight compartment, an aperture in said compartment, a light source in said compartment, a lens mounted on said carriage, a prism provided in said compartment for reflecting light from said source through said aperture on said lens, and a light shield disposed in said compartment between said source and said lens for substantially preventing direct light rays from said source from reaching said lens.

5. In a radio receiver, a pointer mechanism for a tuning indicator comprising a carriage, a track for slidably mounting said carriage, means for moving said carriage along said track, said carriage including a substantially light tight compartment, an aperture in said compartment, a light source in said compartment, a cylindrical lens mounted on said carriage adjacent said aperture, a prism provided in said compartment for reflecting light from said source through said aperture on said lens, and a light shield disposed in said compartment between said source and said lens for substantially preventing direct light rays from said source from reaching said lens.

6. In a radio receiver, a pointer mechanism for a tuning indicator comprising a carriage, a track for slidably mounting said carriage, means for moving said carriage along said track, said carriage including a substantially light tight compartment, an aperture in said compartment, a light source in said compartment, an elongated cylindrical lens mounted on said carriage adjacent to said aperture, a prism provided in said compartment for reflecting light from said source through said aperture on said lens, and a light shield disposed in said compartment between said source and said lens for substantially preventing direct light rays from said source from reaching said lens, said light source being slidably mounted on said shield to vary the optical distance between said source and said lens.

GERALD J. BARRY.

REFERENCES CITED

The following references are of record in the file of this patent:

UNITED STATES PATENTS

| Number | Name | Date |
|---|---|---|
| 1,500,039 | Shuman | July 1, 1924 |
| 1,741,683 | Dickey | Dec. 31, 1929 |
| 1,894,111 | Marcellus | Jan. 10, 1933 |
| 1,899,804 | Hopfield | Feb. 28, 1933 |
| 1,958,996 | Hansen et al. | May 15, 1934 |
| 2,122,998 | Brodton | July 5, 1938 |
| 2,128,246 | Hardesty | Aug. 30, 1938 |
| 2,133,081 | Colvin | Oct. 11, 1938 |
| 2,143,141 | Cooley | Jan. 10, 1939 |
| 2,173,503 | Strassenburg | Sept. 19, 1939 |
| 2,193,107 | Maris | Mar. 12, 1940 |
| 2,305,991 | Price | Dec. 22, 1942 |
| 2,367,939 | Gregory | Jan. 23, 1945 |